(12) United States Patent
Tippett (10) Patent No.: US 12,275,131 B2
(45) Date of Patent: Apr. 15, 2025

(54) CONTROL SYSTEM FOR AND METHOD OF OPERATING JOINTS

(71) Applicant: Jonathan Tippett, Vancouver (CA)

(72) Inventor: Jonathan Tippett, Vancouver (CA)

( * ) Notice: Subject to any disclaimer, the term of this patent is extended or adjusted under 35 U.S.C. 154(b) by 1322 days.

(21) Appl. No.: 16/614,377

(22) PCT Filed: May 17, 2018

(86) PCT No.: PCT/CA2018/050583
§ 371 (c)(1),
(2) Date: Nov. 18, 2019

(87) PCT Pub. No.: WO2018/209442
PCT Pub. Date: Nov. 22, 2018

(65) Prior Publication Data
US 2020/0108510 A1   Apr. 9, 2020

(30) Foreign Application Priority Data
May 17, 2017   (AU) ................. 2017901841

(51) Int. Cl.
*B25J 13/02* (2006.01)
*B25J 9/00* (2006.01)
(52) U.S. Cl.
CPC ........... *B25J 13/025* (2013.01); *B25J 9/0006* (2013.01)

(58) Field of Classification Search
CPC ....... B25J 13/025; B25J 9/0006; E02F 9/2004
See application file for complete search history.

(56) References Cited

U.S. PATENT DOCUMENTS

| | | | | |
|---|---|---|---|---|
| 5,912,658 A | * | 6/1999 | Bergamasco | B25J 13/02 600/595 |
| 11,246,787 B2 | * | 2/2022 | Lince | A61H 1/0288 |
| 2003/0120183 A1 | * | 6/2003 | Simmons | A61F 4/00 600/595 |
| 2011/0071664 A1 | * | 3/2011 | Linn | B25J 9/0006 294/25 |
| 2011/0214524 A1 | * | 9/2011 | Jacobsen | A61H 1/0266 901/21 |
| 2012/0283845 A1 | * | 11/2012 | Herr | A61F 2/64 623/24 |
| 2013/0219585 A1 | * | 8/2013 | Bergelin | B25J 9/0006 2/160 |

* cited by examiner

*Primary Examiner* — Rachid Bendidi
(74) *Attorney, Agent, or Firm* — Perpetual Motion Patents (57) ABSTRACT

A servomechanism and method of operating same are provider. The servomechanism may be used in walking vehicles or construction vehicles. An operator provides a force to an input joint which controls a powered joint of the vehicle. Force is detected in a feedback system between the powered joint and input joint to control the power to an actuator driving the powered joint.

14 Claims, 9 Drawing Sheets

CONTROL SYSTEM FOR AND METHOD OF OPERATING JOINTS

FIELD OF THE INVENTION

The invention pertains to the field of controllable vehicles and machines. More particularly, the invention pertains to powered, exoskeletal machines, controlled using feedback.

BACKGROUND OF THE INVENTION

Walking and constructions vehicles are controlled by human operators but require huge forces to move the vehicle joints, such as legs or end effectors. There are several design complications in creating a control system that provides a mapping of force, position and velocity of the operator to the vehicle's joint.

The article, "Prosthesis: The Anti-Robot", Fluid Power Journal (posted online Jan. 1, 2014) describes a walking vehicle using pairs of hydraulic feedback cylinders to create parity between and exoskeletal control frame and a powered joint. This system uses a rotational encoder in parallel with a bi-directional re-centering spring and mechanical damper mechanism to pick up operator inputs. The inventor has realized improvements in control of such as system.

SUMMARY OF THE INVENTION

Certain embodiments of the invention improve operability of existing vehicle control systems.

According to a first aspect of the invention there is provided a servomechanism for a vehicle joint comprising: a control joint for receiving a bidirectional input from an operator; a powered joint to be controlled;
  a feedback system comprising: a pair of feedback actuators, a first of the feedback actuators acting on the control joint and a second of the feedback actuators acting on the powered joint, the actuators operatively coupled to send and receive a feedback signal from each other, such that a force on the powered joint acts via the feedback cylinders upon the input joint and vice versa. There is further a force transducer for measuring a force on the control joint or within the feedback system; a powered actuator connected to the powered joint; and a controller arranged to receive the output signal from the force transducer and to provide power to the powered actuator.

A construction vehicle may employ said servomechanism to control an end effector.

A walking vehicle may comprise a plurality of joints for ambulation and plurality of said servomechanisms, each of said joints individually controlled by one of the servomechanisms.

The vehicle may further comprise an exoskeletal frame for receiving the operator, wherein the frame has a plurality of movable members, each corresponding to one of the input joints of the servomechanism.

According to a second aspect of the invention there is provided a method of controlling a servomechanism comprising: a) an operator providing an input force to an input joint; b) sensing a residual force in a feedback system comprising a fluid communication between an input joint and a powered joint; and c) controlling power to a powered actuator based on the sensed residual force. The powered joint is urged by the powered actuator to move in a direction that reduces the residual force in the feedback system.

According to a third aspect of the invention there is provided a feedback mechanism for a walking vehicle comprising: a vehicle joint movable in a first plane; a suspension link movable in a second plane, separated from the first plane by a connection link, which connection link is connected at one end to the vehicle joint and at the other end to the suspension link; a joint feedback actuator connected to the connecting link at an adjustable location between the vehicle joint and suspension link; and a pilot feedback actuator remotely coupled with the joint feedback actuator to impart a feedback force to the pilot.

The connection link may be a threaded rod and the joint feedback actuator is adjustable located by one or more nuts on the rod. The vehicle joint and suspension link connections to the connection link may permit two degrees of rotational freedom.

According to a fourth aspect of the invention there is provided a device for controlling a vehicle joint comprising: an input link comprising an operator joint mechanically in series with a feedback actuator, wherein the operator joint is arranged to receive a displacement from an operator and the feedback actuator is arranged to receive an input regarding a force experienced by the vehicle joint; a force sensing mechanism comprising a displacement sensor mechanically in parallel with a biasing member, wherein the displacement sensor is arranged to measure bidirectional displacement of the biasing member from a neutral state; and wherein the force sensing mechanism is connected in series with the input link and outputs a signal to operate the vehicle joint.

The feedback actuator may be arranged to counteract the displacement provided by the operator as the vehicle joint moves. The displacement sensor may be mechanically in parallel with a damper. The bias member, damper, and encoder may be fixed to rotate together on a shaft. The output force signal may be determined by a measured displacement of the biasing member multiplied by a spring constant of the biasing member.

DETAILED DESCRIPTION

Provided is a closed-loop control system (or servomechanism) for controlling the movement of a joint. The system is particularly useful in controlling a joint in a construction vehicle such as the end effector of an excavator or for controlling a joint in a walking vehicle, popularly called a Mech. The control system working in the force domain rather than the position or velocity domains. The vehicle is controlled by a human operator (also known as a pilot or driver) with the help of a feedback system.

In typical systems, the operator moves an input joint, such as a joystick or simple lever. The simplest open-loop control system would typically move a powered joint forward as long as the input joint was forward (or backward as long as the input joint was backward) of a neutral position. Closed-loop systems might measure the position of the input joint and move the powered joint to match. In the former case, positional parity is never maintained. In the latter case, positional parity between input and powered joints is maintained, however, there may be lag for the powered joint to catch up to the requested position. Proportional, integral and differential (PID) control means may be employed to smooth the movements.

There is also a lack of 'feel' of the end effector or powered joint on external objects, unless the system additionally provides haptic feedback at the input joint to simulate the force on the powered joint. This not only adds extra cost but also will never truly simulate what the powered joint is encountering. These lags and external obstacles also mean that it is possible for the operator to move the input joint quickly to an extreme end that the powered joint cannot meet immediately, potentially moving violently through the obstacle in order to catch up.

In the present system, the loop is closed by transmitting forces between driven and input joints, whereby the input joint acts on the powered joint and vice versa. Thus any force experienced by the powered joint is also felt by the operator connected to the input joint.

A force transducer senses the force in the feedback system to produce an electrical output signal. This signal is used to control a power actuator, which is arranged to drive the powered joint. The whole system is arranged such that the powered joint is urged to move in a direction that will reduce the residual force in the feedback system. Thus the powered joint moves in the direction requested by the operator by applying a net force.

Advantageously this system allows an operator to apply a controllable force at the powered joint to external objects, whereas prior systems would apply whatever force was needed to move the powered joint to the requested position.

Figure 1:
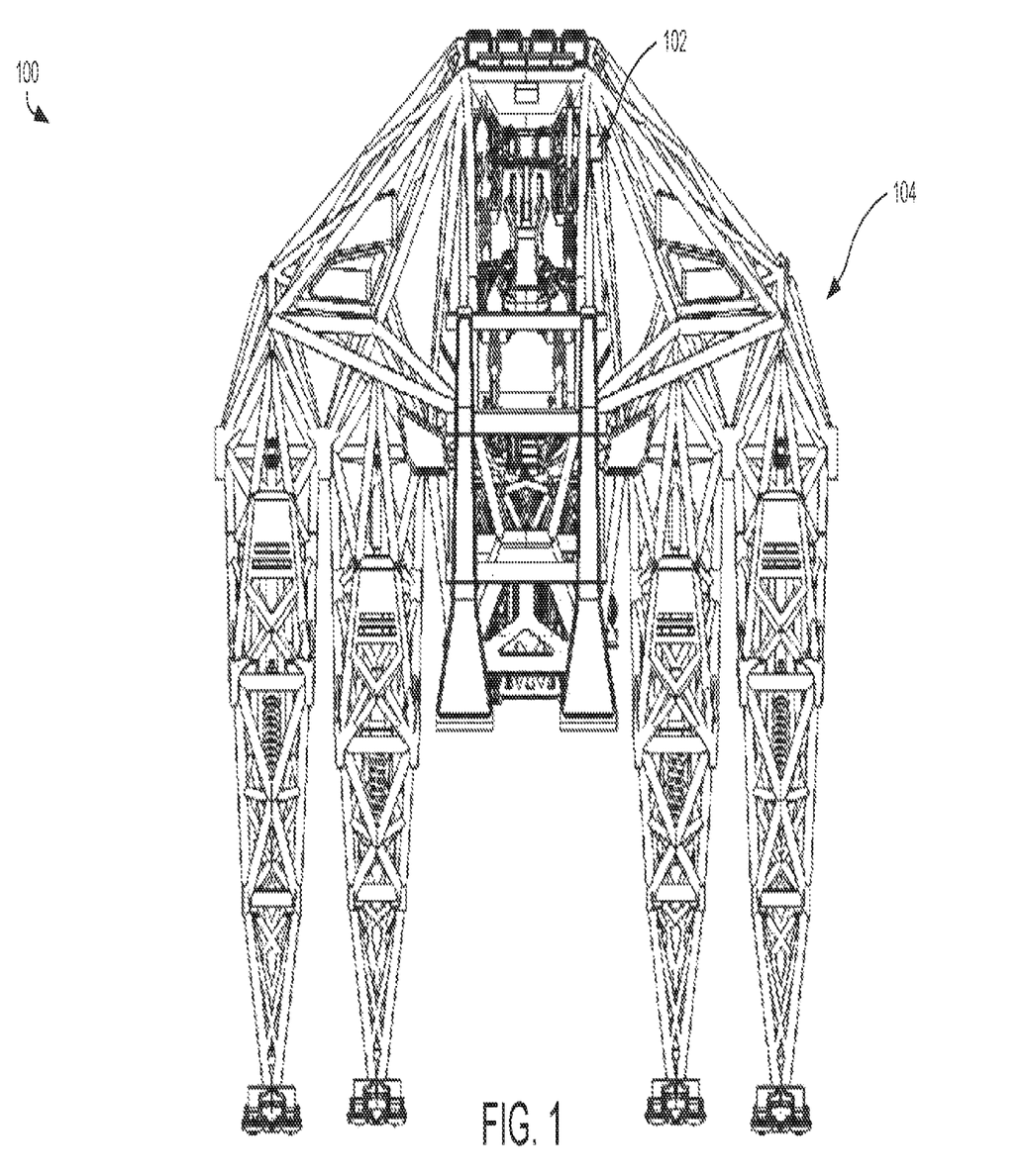
FIG. 1 is a walking vehicle adapted to use the present control system.

FIG. 1 shows a mech 100 with a plurality of joints to provide ambulation of the mech, each joint controlled individually by a corresponding closed-loop control system. An operator knot shown) sits in the middle of the mech, enclosed in an exoskeletal harness 102 and frame 104. The frame 104 provides a rigid structure to hold the power plant and to which joints are movably connected. Certain joints proximate to the operator's harness 102 are movable with respect to the frame 104 and act as the input joints. These joints are preferably rotatable and physically align with the joints of the operator's limbs.

Figure 2:
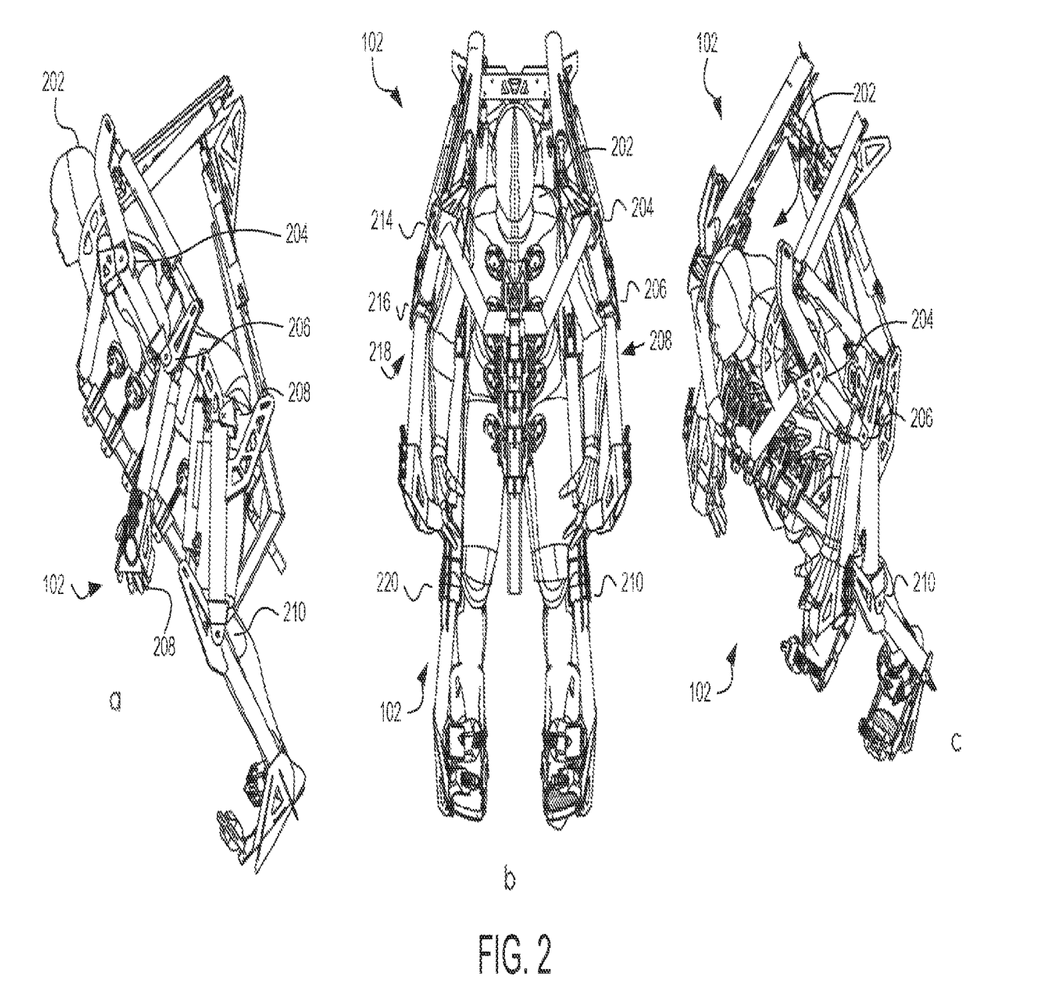
FIG. 2 is a drawing of an exoskeletal harness for operating a walking vehicle.
Figure 3:
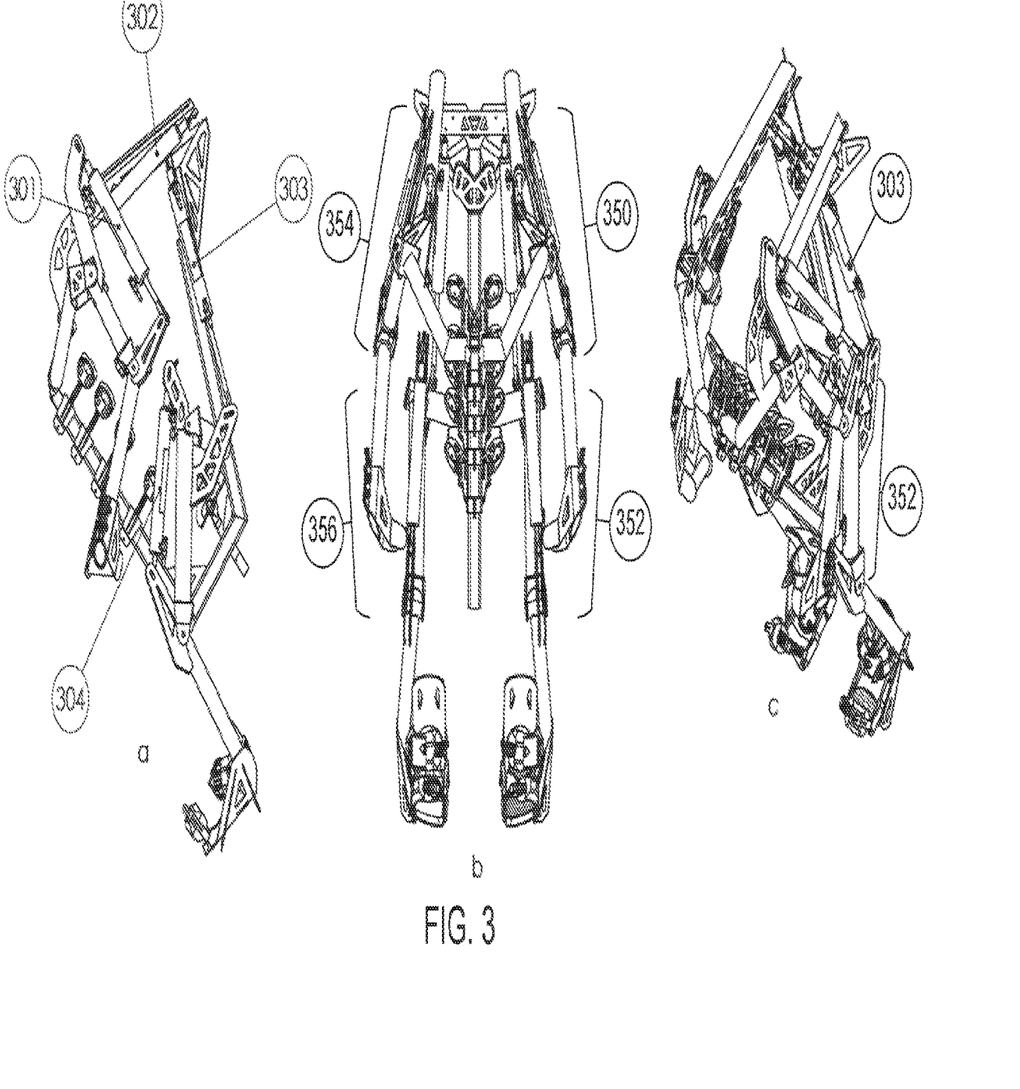
FIG. 3 is a drawing of an exoskeletal harness without the operator.

FIG. 2 shows operator 202, from different perspectives, surrounded by the joints (such as, joint 202) making up the exoskeletal frame. FIG. 2a, 2b, or 2c show frame 104 includes joint 204, joint 206, joint 208, and joint 210 disposed on the left side of operator 202. FIG. 2b shows frame 104 includes joint 214, joint 216, joint 218, and joint 220 disposed to the right side of operator 202. FIG. 3 is a drawing of frame 102 without the operator, showing eight input joints corresponding to the operator's arms and legs. As shown in FIG. 3a, frame 102 includes a first plurality of input joints 350, a second plurality of input joints 352, both disposed on the operator's left side, and further includes a third plurality of input joints 354, a fourth plurality of input joints 356, both disposed on the operator's right side. There are two of each kind of joint, in accordance with the symmetry of the human body. Four operator feedback elements are indicated in FIG. 3a, the function of which is described below and illustrated in FIG. 4. Operator feedback element (301) corresponds the pilot elbow. Operator feedback element (302) corresponds to the pilot's shoulder. Operator feedback element (303) corresponds to the pilot's hip. Operator feedback element (304) corresponds to the pilot's knee. An arm has a shoulder and an elbow DOF (degree of freedom) inputs.

Figure 4:
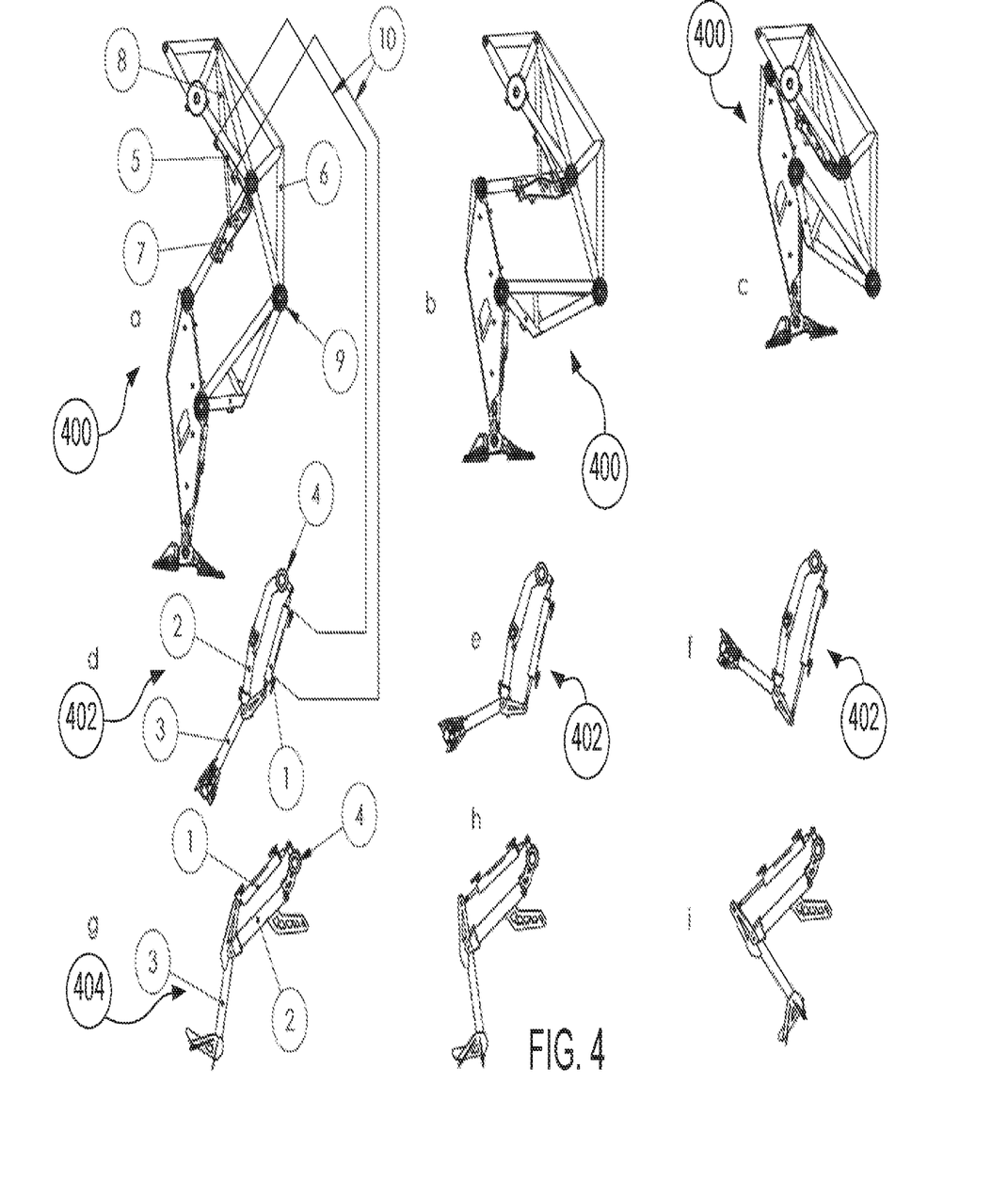
FIG. 4 is a drawing of how two different input joints could be used to operate a machine joint.

FIG. 4 is a close up of one input joint at three different positions. In the arrangement shown, an operator's flexion applies force to rotate the control limb 3, thus rotating encoder 4, which sends a command signal to the ECU. The control limb permits bidirectional input commands, to move the powered joint 7 bidirectionally, and receives bidirectional force feedback.

In preferred applications of the control system, such as a mech or construction vehicle, the powered joint is remote from the control limb, making a direct rigid connection therebetween impractical. In preferred embodiments, a force feedback system is provided by a pair of feedback actuators operable coupled together in a push-pull manner, such that one joint acts on the other via the coupling. To the extent that the feedback system is minimally compressible, there is positional parity between powered and control joints, as one joint cannot move without moving the other joint.

The feedback system may comprise a pair of feedback actuators, one connected to the control joint 3 and the other connected to the powered joint. Another part of each feedback actuator is also connected to the frame, so that actuation of the actuator provides a movement of one joint with respect to the frame. In the case of fluid feedback actuators, the actuators are plumbed with fluid lines, such that when one feedback actuator is acted upon by one joint, it pressurizes a fluid in the fluid lines which act on the other feedback actuator, which then acts on the other joint. As the vehicle joint moves, the feedback system restores the force in the feedback system towards a neutral state. If the vehicle joint encounters an obstacle, the force in the feedback system builds, quickly stopping the operator's movement, unless they increase their imparted force to the point where the magnified force at the vehicle joint can push through the obstacle.

The feedback actuators may be fluid or electro-mechanical. Fluid feedback actuators may be pneumatic or hydraulic. They may be rotary actuators providing rotational movement about a pivot of a joint, or linear actuators providing linear motion to a link of the joint, in each case movement is with respect to the frame or another joint. Fluid actuators may be rotary using gear pumps and motors, or linear using axial piston pumps, which may be fixed or variable.

The size of the vehicle is very large compared to the operator, meaning that the input joint cannot drive the powered joint without powered assistance. Thus a powered actuator is connected to the powered joint to amplify the force provided by the operator. The powered actuator has a larger force capacity than the feedback actuator, preferably at least ten times larger, more preferably 100-200 times larger. Not only does this amplify the operator's force but also ensures that overly large external forces acting on the powered joint do not harm the operator. The powered actuator may be a hydraulic actuator, pneumatic actuator, or electric motor.

The feedback system operates in the force domain, rather than being based on velocity or displacement. To detect the residual force, a force transducer is connected to an element of the feedback system that experiences the force between the control limb 3 and powered joint 7, which force may be provided by the operator on the control limb or by external objects on the powered joint. The transducer may be a strain or force sensor connected to the input joint.

Alternatively the transducer may be a pressure sensor connected to the fluid coupling in the feedback system. A detected pressure above a neutral pressure would indicate that the operator is urging the powered joint in a first direction. A detected pressure below a neutral pressure would indicate that the operator is urging the powered joint in a second direction, opposite the first.

A drawback of the single sensor embodiment is that there are limits to detecting negative pressures, thus limiting the bidirectional range of the system. This embodiment is not robust to fluid leakage and temperature changes, which cause pressure changes unrelated to feedback forces.

Thus In another embodiment, two pressure sensors are used and processed differentially to detect the residual force. A first pressure sensor is connected to measure fluid pressure in the first fluid line and a second pressure sensor is connected to measure fluid pressure in the second line. In this case, fluid leakage, electrical noise and thermal noise may cause a net pressure differential even under no load in the feedback system. The signal processor of the ECU calculates the difference between the two sensors, subtracting the differential pressure under no load (neutral pressure), to output a signal representing the residual force in the feedback system.

The output signal is sent to a valve to control the direction of flow of pressurized working fluid from a reservoir to the powered fluid actuator. The valve may be a spool valve. For example, in the case where the operator is urging the control limb forward, the output signal will be positive and control the spool valve to open a first port to send working fluid to act on a first port on the powered actuator, in the direction that extends the leg. Conversely, the operator pulling back on the control limb produces a negative output signal that controls the spool valve to close that first port and open a second port to send working fluid to act on a second port of the powered actuator, in the direction that retracts the leg.

Figure 7:
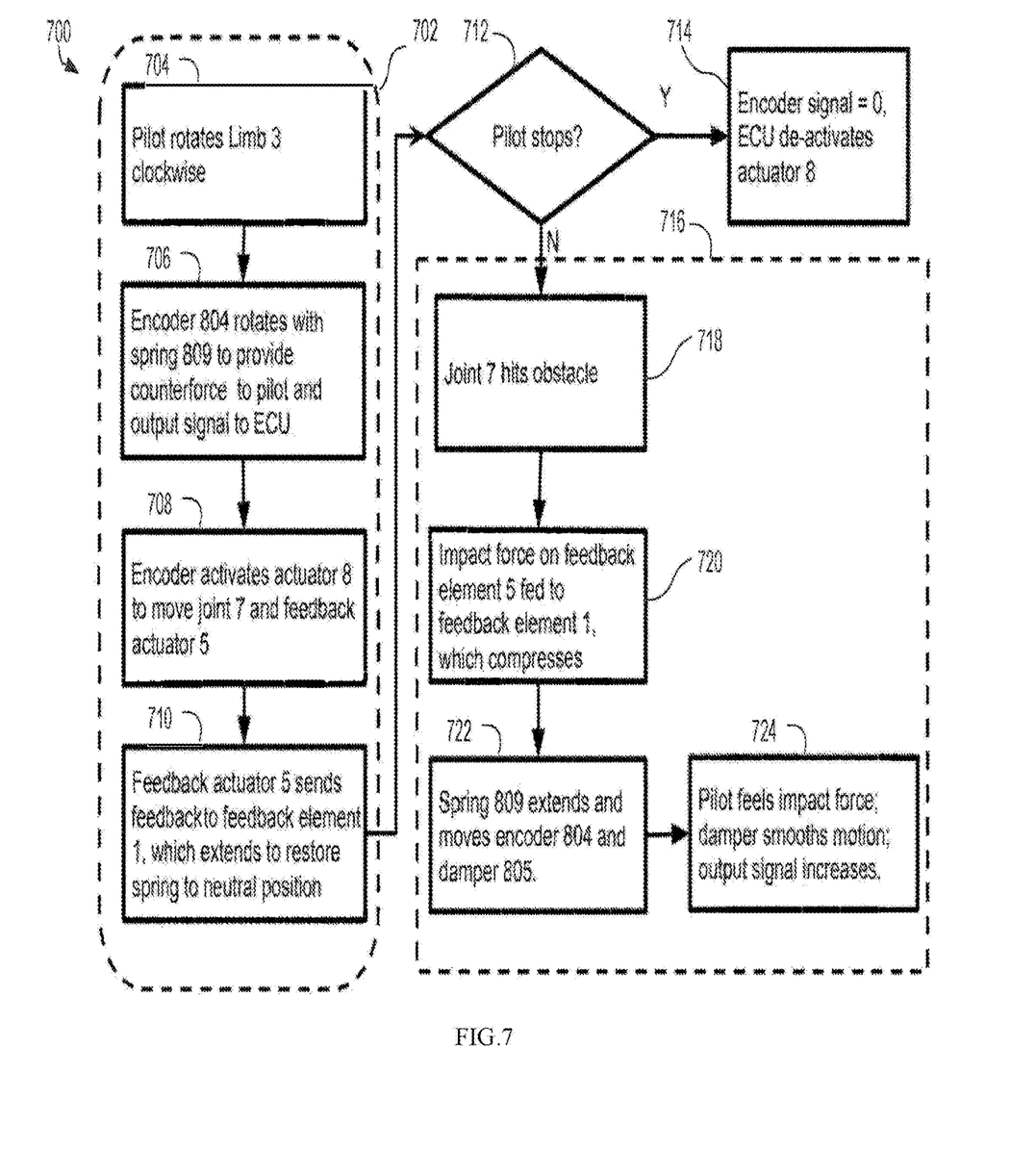
FIG. 7 is a flow chart showing movement between key components of the system.

Alternatively, the output signal controls the polarity of electric power to an electric actuator to drive the powered joint. FIG. 7 provides a flowchart of the control system with feedback.

FIG. 4 shows a preferred embodiment of a system to allow the movement of a pilot's elbow or knee, to control the movement of a powered joint (9), in this case is the knee joint of the mech leg 400.

FIG. 4 a) shows the mech leg 400 with the knee joint (9) in full extension.

FIG. 4 b) shows the mech leg 400 with the knee joint (9) in half extension.

FIG. 4 c) shows the mech leg 400 with the knee joint (9) in full retraction.

FIG. 4 d) shows a portion of the exo-skeletal control frame 402 in which the pilot would put their arm, as shown in FIG. 3 for example the first plurality of input joints 350, in full extension, matching the position of the mech knee joint (9) in FIG. 4 a).

FIG. 4 e) shows the portion of the exo-skeletal control frame in which the pilot would put their arm, as shown in FIG. 3, in half extension, matching the position of the mech knee joint (9) in FIG. 4 b).

FIG. 4 f) shows the portion of the exo-skeletal control frame in which the pilot would put their arm, as shown in FIG. 3, in full retraction, matching the position of the mech knee joint (9) in FIG. 4 c).

FIG. 4 g) shows a portion of the exo-skeletal control frame 404 in which the pilot would put their leg, as shown in FIG. 3, for example the second plurality of input joints 352, in full extension, matching the position of the mech knee joint (9) in FIG. 4 a).

FIG. 4 h) shows the portion of the exo-skeletal control frame in which the pilot would put their leg, as shown in FIG. 3, in half extension, matching the position of the mech knee joint (9) in FIG. 4 b).

FIG. 4 i) shows the portion of the exo-skeletal control frame in which the pilot would put their leg, as shown in FIG. 3, in full retraction, matching the position of the mech knee joint (9) in FIG. 4 c).

Figure 5:
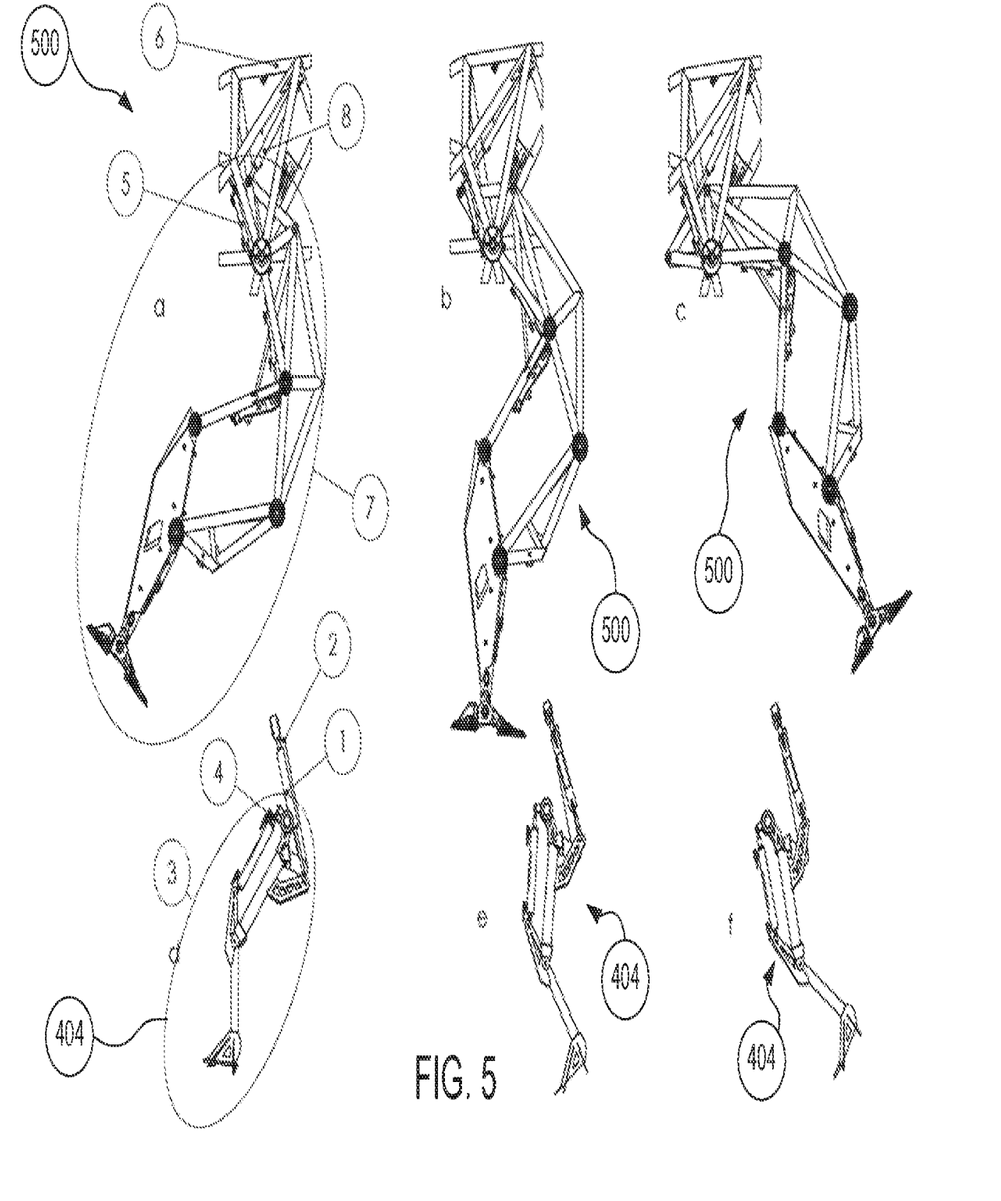
FIG. 5 is a drawing including at least one powered joint, at least one control joint, and a control system.
Figure 6:
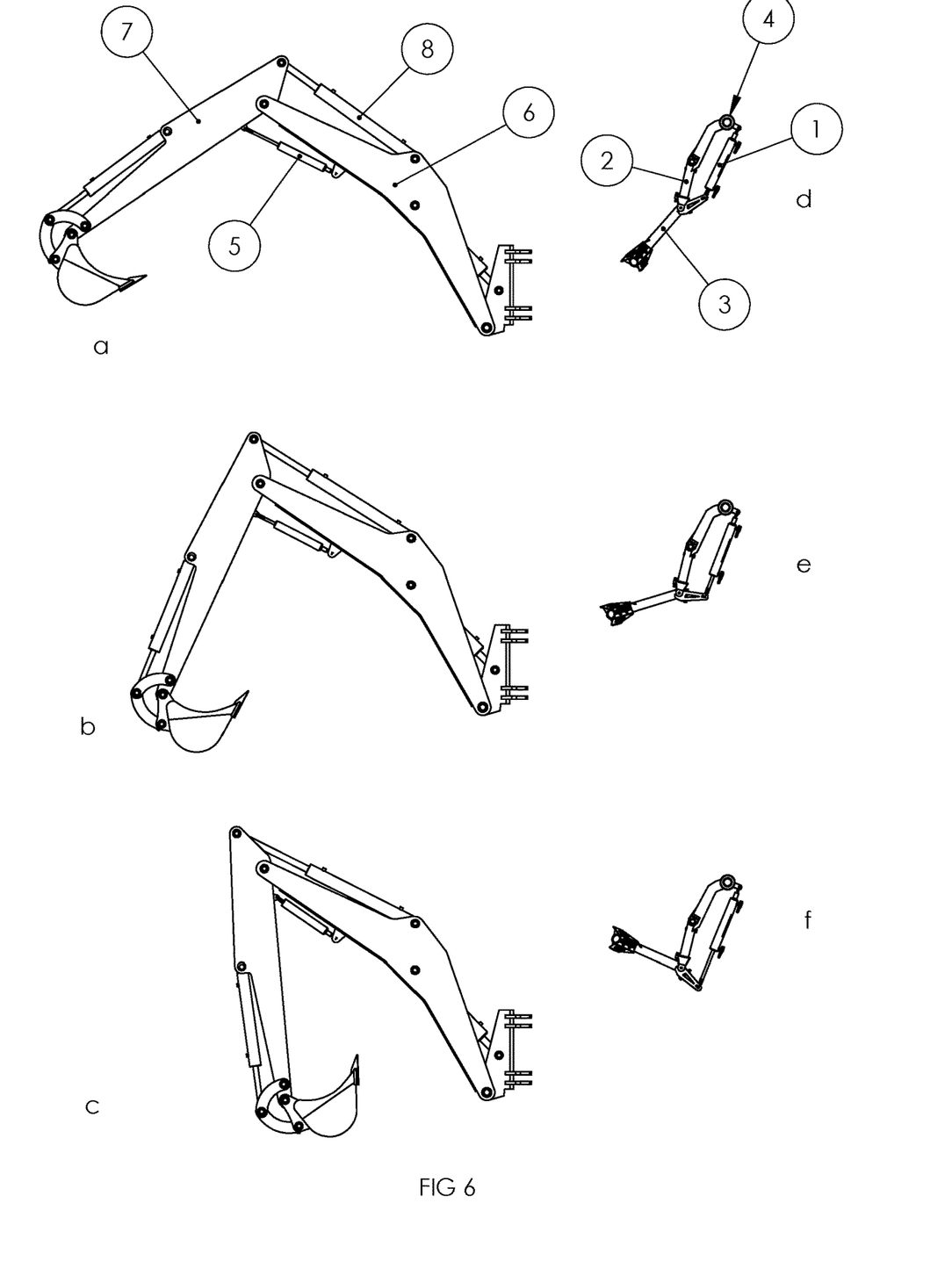
FIG. 6 is a drawing of how a single operator joint could be used to operate an excavator joint.

FIG. 5 shows a mech leg 500 and a portion of the exo-skeletal control frame 404. The basic elements of the control system are an operator feedback element (1), a fixed exo-skeletal control limb element (2), a moving exo-skeletal control limb element (3), an operator force input encoder element (4), a powered joint feedback element (5), a fixed powered joint element (6), a moving powered joint element (7) a powered joint actuator (8) and a powered joint (9).

Sequential Kinematics of the Feedback System

Figure 8:
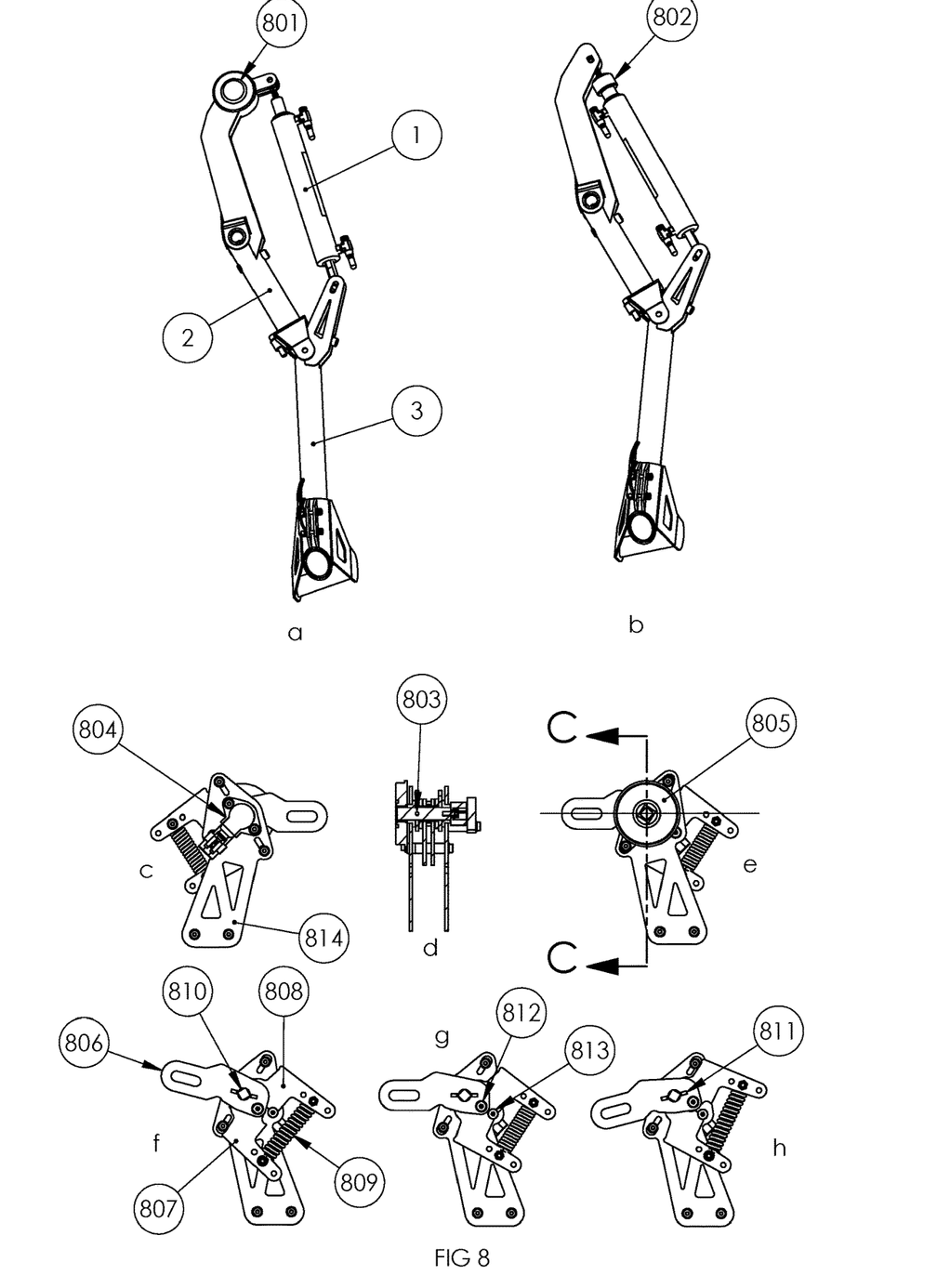
FIG. 8 is a drawing of multiple embodiments of the force encoder and detail of a preferred embodiment.

The system works by the operator applying a force to the moving exo-skeletal control limb element (3). This force is transmitted through the operator feedback element (1) to the operator force input encoder element (4). The encoder (4) may be rotary, as shown in FIG. 8 a) or linear, as shown in FIG. 8 b). The encoder could be mechanical or solid state.

The embodiment of FIG. 3 has 8-DOF, but this technology could be used on with vehicles with other DOF, for example 2-DOF shoulder or 2-DOF hip joints.

The encoder (4) transmits the force signal to an electronic control unit (ECU), as shown in FIG. 5, which could be a standard, industrial control unit such as a Hydraforce Cortek 2415 if hydraulics are being used, or a custom electronic control unit, provided that the control unit is properly matched to the powered actuators being used.

The encoder signal is interpreted by the ECU and commands the powered actuator (8) to move in the direction indicated by the applied force from the pilot.

As the moving powered joint element (7) moves under the influence of the powered actuator (8), it causes the powered joint feedback element (5) to move as well. This movement induces a movement in the operator feedback element (1) which causes the input movement made by the pilot to be un-done counteracted, thus reducing the signal to the force encoder and arresting the movement of the powered joint (9). If the pilot wishes movement to continue, they must move their own joint in the direction of movement in order to maintain the applied force and signal to the operator force input encoder (4). This creates positional parity between the operator joint and the powered joint.

Variable Feedback Biasing Mechanism

This mechanism is specific to joints using linear powered joint feedback elements where there is intentional compliance in the joint position with respect to the actuator position, such as for the purpose of shock absorption.

Figure 9:
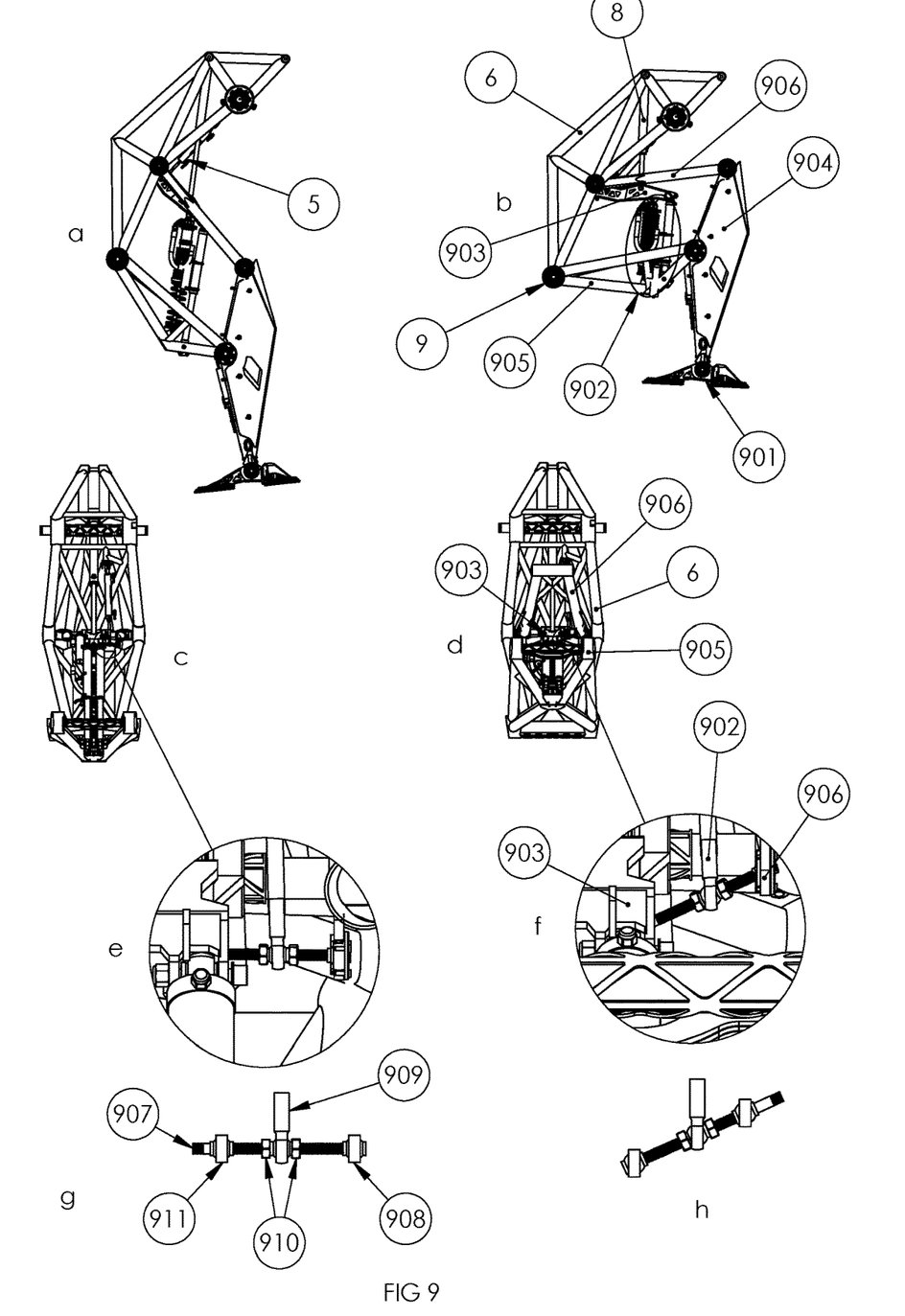
FIG. 9 is a drawing of a mechanism that allows adjustment of feedback behavior.

The mech has suspension in its legs to reduce loads on the machine and pilot due to impacts and accelerations. FIG. 9 shows a mech leg with suspension which allows the knee joint (9) to yield to loads axial to the leg placed on the foot (901) by moving generally vertically in a first plane. FIG. 9 a) shows the leg with uncompressed suspension and FIG. 9 b) shows the leg with suspension compressed. Compression is controlled by the use of one or more suspension elements (902) including dampers, coil springs and air shocks operating in series with the powered joint actuator (8). The suspension elements are connected by suspension link (903) to the powered joint actuator (8) by a connection link (907) such that their planes of motion are separated. When a load equal to or greater than the desired load to be absorbed is applied to foot (901), the force travels through lower leg (904), causing lower link (905) to rotate about powered limb joint (9), moving in a first plane, thus compressing the suspension elements to move in a second plane against the suspension link (903) which is held in place by the powered actuator. The lower leg is also attached to the upper link (906), which serves to stabilize the lower leg. This results in the actual powered limb joint position being a function of the position of the powered actuator (8), and the state of compression of the suspension elements (902). The variable feedback biasing mechanism shown in FIG. 9 g) allows the pilot to choose the proportion that powered joint feedback element (5) will move between on the movement of the powered actuator and the suspension compression, based on the adjustable location of the powered joint feedback element (5) along the connection link (907). The advantage to having this adjustment available is that pilots with different skill levels or personal preferences can choose which of these kinematic parameters is transmitted back to them.

The variable feedback biasing mechanism is comprised of 3 spherical plain bearings arranged on connection link (907). These bearings could equally be any 3-DOF joint allowing rotation in three orthogonal axes. A first bearing (908) is affixed to the end of connection link (907) during assembly and its position along connection link (907) does not change during operation, or for the purpose of adjustment. A second bearing (909) is mounted on the threaded connection link (907) and its position may be adjusted at any point along the length of the link. In this embodiment, that bearing is part of a standard rod end which is affixed to the end of the powered joint feedback element (5). It is locked in to position along the shaft during operation by making the shaft threaded and using nuts (910) on either side of the bearing. It may alternately be locked in position by having clamps or by having collars with set screws on either side of the bearing. A third bearing (911) is located on the end of the shaft distal to the first and second bearings. This bearing is permitted to slide freely along the length of the connecting link during operation. The first bearing (908) is mounted in the upper link (906). The third bearing (911) is mounted in the suspension link (903), as shown in FIGS. 9 e) and f).

When the powered actuator moves the knee joint, both the suspension link and upper link move together, causing the connection link (907) to preserve its angular position with respect to these elements, as shown in FIG. 9 e). In this case the movement of the second bearing (909), and thus the powered joint feedback element (5) will be the same regardless of its position on the connection link (907). However, if the suspension is compressed, the upper link (906) will move relative to the suspension link (903) and cause the connection link (907) to change angle relative to the plane in which the suspension is moving, as shown in FIGS. 9 f) and h). In this case, the movement of the second bearing (909), and thus the powered joint feedback element (5) will be affected by its position on the connection link (907). If it is near the upper link (906), it will move substantially with suspension compression. If it is near the suspension link (903), it will not move substantially with suspension compression. Thus, the pilot may select to what degree the suspension movement is transmitted back to the exo-frame controls by choosing at what point on the connection link (907) the second bearing (909) is located.

Bi-Directional Force Encoder

FIG. 8 shows two different embodiments of an operator input encoder (4). FIG. 8 a) shows a rotary encoder with a torque arm (806) connected to the operator feedback element (1) and an encoder frame (814) connected to the fixed exo-skeletal control limb element (2). When the operator pushes or pulls on the moving exo-skeletal control limb element (3), the force is transmitted through the operator feedback element (1), and it creates a moment about the encoder that can be used to measure the force being applied to the moving exo-skeletal control limb element (3). FIG. 8 b) shows a linear encoder attached at one end to the end of the operator feedback element (1) and on the other end to the fixed exo-skeletal control limb element (2). Either rotary or linear encoders could be mechanical or solid state.

FIG. 8 c, d, e, f, g, h show a preferred embodiment of a bi-directional, self re-centering damped mechanical rotary encoder. The operator feedback element (1) connects to a torque arm (806) which is rotationally locked to a central shaft (810) by means of a pin (811) through a hole (803) in the shaft (810). The torque arm (806) could equally be rotationally locked to the central shaft (810) by a keystock, spline, clamp, set screw or other means. When the torque arm (806) receives a force from the operator feedback element (1), it rotates the central shaft (810). This rotation is measured by an electronic rotary encoder (804) attached at one end of the shaft, being fixed to the encoder frame (814). At the other end of the central shaft is a bi-directional rotary damper to prevent rapid, noisy movements in the shaft due to kinematic feedback experienced by the pilot. As the torque arm (806) rotates upwards, as shown in FIG. 8 f), torque arm pin (812) is urged against upper spring arm (808). Lower spring arm (807) is held in place with respect to encoder frame (814) by fixed pin (813), thus causing spring (809) to extend. When the force is released, spring (809) pulls upper spring arm (808) back to the centered, or neutral position, with the rate of re-centering modulated by bi-directional rotary damper (805). The opposite kinematics are observed when the force is in the opposite direction.

More generally the skilled person will appreciate that a variety of self-centering mechanisms may be designed similar in mechanical principle to that of FIG. 8. The control limb and feedback actuator are arranged mechanically in series to provide a input mechanism having the combined input force and displacement of the pilot and feedback from the vehicle joint. The combined force is countered by, and the combined displacement is absorbed by, the biasing member, which is also arranged in series with the input mechanism.

A displacement (or position sensor), biasing member and damper are arranged to move mechanically in parallel with each other and provide a force sensing mechanism. They may be fixed together on a single shaft but the skilled person will appreciate that other mechanical connections may be used to this effect. Any movement of the biasing member is detected as a displacement by the sensor connected thereto. The output signal may be considered a force signal, being the measured displacement multiplied by the biasing member's spring constant.

FIG. 7 describes the order of operations 700, wherein operations grouped by dashed boxes (e.g., 702) are almost simultaneous. To start, at 704, the pilot rotates the control limb 3, which urges the feedback actuator against the spring 809 (at 706). The encoder moves in parallel with the spring and outputs an electric signal to the ECU indicating a command to move the vehicle. At 708, the ECU operates a hydraulic valve or electric switch to activate actuator 8 and move powered joint 7, for example, a vehicle joint.

At 710, the feedback actuator 5 (initially experiencing a neutral force) is extended (or compressed), thus sending a feedback signal to feedback element 1 (as a fluid pressure or electric signal). The feedback actuator 1 is set-up to counter the initial pilot movement to restore the combined input mechanism displacement to neutral position. E.g., if the pilot movement compressed the spring 809, the feedback actuator moves to uncompress the spring towards its neutral state. Thus the pilot and feedback displacements counteract each other if the vehicle joint moves smoothly. Here the vehicle joint and control limb will have positional parity, albeit with a small amount of play in the compressed spring if the pilot wishes to keep moving.

Operations continue at 712 to test if the pilot stops. If 712-Yes, then at 714, the encoder is set to zero, and the ECU de-activates actuator 8. For example, when the pilot releases the force on the control limb, the spring and encoder return to their neutral state. However, 712-No, then operations in operations 700 continue at 716. At 718, if the joint 7 (e.g. vehicle joint) were to encounter an obstacle, there would be a sudden impact force on the joint 7. At 720, there is an impact force on feedback element 5 and is fed to feedback actuator 1, which compresses. For example, an adjustable proportion of which (see FIG. 9) acts on the feedback actuator 5. At 720, the feedback actuator 1 receives the feedback signal, which now further displaces the spring causing an impact force on the pilot (in addition to the pilot's input force). At 722, spring 809, shown in FIG. 8, extends and moves encoder 804 and damper 805. At 724, the pilot feel an impact force, the damper smooths the motion, and the output signal increases.

The invention claimed is:

1. A servomechanism for a vehicle joint comprising:
    a control joint for receiving a bidirectional input from an operator;
    a powered joint to be controlled in response to the bidirectional input from the operator;
    a feedback system comprising a pair of feedback actuators, wherein
        a first feedback actuator of the pair of feedback actuators acts on the control joint and a second feedback actuator of the pair of feedback actuators acts on the powered joint, and the pair of feedback actuators are operatively coupled to send and receive a force feedback signal from each other, such that a force on the powered joint acts via the pair of feedback actuators upon the control joint and a force on the control joint acts via the pair of feedback actuators upon the powered joint;
    a force transducer, which in response to a force applied on the control joint or within the feedback system, provides an output signal;
    a powered actuator connected to the powered joint, which powered actuator comprises one of: a hydraulic actuator, a pneumatic actuator, or an electric motor; and
    a controller configured to receive the output signal from the force transducer and provide power to the powered actuator to move the powered joint in a direction indicated by the bidirectional input from the operator.

2. The servomechanism of claim 1, wherein the force transducer comprises a force sensor or a strain sensor mounted to the control joint to measure force on or strain in the control joint.

3. The servomechanism of claim 1, wherein, the pair of feedback actuators include a fluid feedback actuator, and the force transducer comprises a pressure sensor in fluid connection with the feedback fluid actuator.

4. The servomechanism of claim 1, wherein the pair of feedback actuators are fluid actuators.

5. The servomechanism of claim 4, wherein the force transducer comprises a pair of pressure sensors in fluid connection with the fluid actuators and the output signal is provided from a differential of pressure signals of the pair of pressure sensors.

6. The servomechanism of claim 4, wherein the controller comprises a fluid control valve that is communicatively coupled to the force transducer, and
the controller, in response to receiving the output signal derived from a respective force applied to the force transducer, outputs pressurized fluid to the powered actuator.

7. The servomechanism of claim 1, wherein:
    the pair of feedback actuators includes a pair of hydraulic cylinders, each cylinder in the pair of hydraulic cylinders includes an input port and an output port, and
    the output port of a first cylinder of the pair of hydraulic cylinders is connected to the input port of a second cylinder of the pair of hydraulic cylinders and the output port of the second cylinder of the pair of hydraulic cylinders is connected to the input port of the first cylinder of the pair of hydraulic cylinders.

8. The servomechanism of claim 1, whereby the first feedback actuator of the pair of feedback actuators is configured to move counter to the control joint input, in response to receiving the feedback signal.

9. A construction vehicle comprising the servomechanism of claim 1 and an end effector controlled by said servomechanism.

10. A walking vehicle comprising a plurality of joints for ambulation and a plurality of servomechanisms according to claim 1, wherein each of said plurality of joints is individually controlled by one of the servomechanisms.

11. The vehicle of claim 10, further comprising an exoskeletal frame for receiving the operator, wherein the exoskeletal frame includes a plurality of movable members, a first movable member in the plurality of movable members corresponds to the control joint of one of the servomechanisms.

12. A method of controlling a walking vehicle the method comprising:
    providing a plurality of servomechanisms according to claim 1, for each said servomechanism,
    receiving the respective bidirectional input from the operator at the respective control joint;
    receiving the respective output signal from the respective force transducer at the controller due to a force applied on the control joint or within the feedback system; and
    providing power to the respective powered actuator based on the respective output signal to move a respective vehicle joint of the walking vehicle.

13. The method of claim 12, further comprising, for each said servomechanism, damping the respective force feedback signal.

14. The method of claim 12, wherein, for each said servomechanisms, the pair of feedback actuators are fluid actuators in fluid communication with a pair of pressure sensors,
    the method further comprising, for each servomechanism, differentially measuring the force feedback signal from the pair of pressure sensors to generate the output signal.

* * * * *